(12) United States Patent
Sawatzky

(10) Patent No.: US 7,155,764 B2
(45) Date of Patent: Jan. 2, 2007

(54) RAIL COUPLING AND LOCK FOR SPLIT-APART BASKET STRETCHERS

(75) Inventor: Randal G. Sawatzky, Kelowna (CA)

(73) Assignee: Traverse Rescue LLC, Kelowna ( * ) Notice: Subject to any disclaimer, the term of this patent is extended or adjusted under 35 U.S.C. 154(b) by 164 days.

(21) Appl. No.: 11/030,996

(22) Filed: Jan. 10, 2005

(65) Prior Publication Data

US 2005/0177943 A1   Aug. 18, 2005

Related U.S. Application Data

(60) Provisional application No. 60/534,697, filed on Jan. 8, 2004.

(51) Int. Cl.
*A61G 1/013* (2006.01)
*F16B 1/00* (2006.01)
*F16B 7/18* (2006.01)
*F16B 7/02* (2006.01)

(52) U.S. Cl. ............... 5/627; 5/625; 403/341; 403/316

(58) Field of Classification Search ............ 5/625, 5/627; 403/296, 293, 292, 286, 316, 317, 403/341, 331
See application file for complete search history.

(56) References Cited

U.S. PATENT DOCUMENTS

| 111,550 | A | * | 2/1871 | Kean | 403/318 |
|---|---|---|---|---|---|
| 391,313 | A | * | 10/1888 | Gordon | 279/101 |
| 2,094,416 | A | * | 9/1937 | Sheffield | 285/330 |
| 2,843,408 | A | | 7/1958 | Stukenborg | |
| 3,073,635 | A | | 1/1963 | Schaefer | |
| 3,574,871 | A | * | 4/1971 | Greene | 5/627 |
| 3,682,506 | A | | 8/1972 | Bruyere et al. | |
| 3,813,712 | A | * | 6/1974 | Bonnin | 5/625 |
| 4,783,862 | A | * | 11/1988 | Murphy | 5/81.1 T |
| 5,595,434 | A | * | 1/1997 | Pasch et al. | 362/102 |
| 6,328,499 | B1 | | 12/2001 | Reding et al. | |
| 6,877,927 | B1 | * | 4/2005 | Paulin et al. | 403/341 |
| 2004/0218972 | A1 | * | 11/2004 | Paulin et al. | 403/331 |
| 2005/0177943 | A1 | * | 8/2005 | Sawatzky | 5/627 |

* cited by examiner

*Primary Examiner*—Robert G. Santos
(74) *Attorney, Agent, or Firm*—Dinsmore & Shohl LLP

(57) ABSTRACT

A split-apart basket stretcher and its corresponding rail coupling and lock, where the stretcher has first and second portions for mounting in opposed facing relation to one another, and the rail coupling and lock releasably locks the first and second portions together in their opposed facing relation using a threaded slidable collet on the end of at least one rail of the first portion. The collet threads onto the end of at least one corresponding rail of the second portion. A spring loaded pin prevents the collet from unthreading until the pin is manually depressed.

20 Claims, 6 Drawing Sheets

RAIL COUPLING AND LOCK FOR SPLIT-APART BASKET STRETCHERS

CROSS REFERENCE TO RELATED APPLICATION

This application claims priority from U.S. Provisional Patent Application Ser. No. 60/534,697 filed Jan. 8, 2004 entitled Rail Coupling and Lock for Split-Apart Basket Stretchers.

FIELD OF THE INVENTION

This invention relates to the field of releasably lockable couplers for releasably locking together the ends of longitudinally extending rails on split-apart basket stretchers.

BACKGROUND OF THE INVENTION

So-called split-apart basket stretchers are known in the prior art. These conventional forms of basket stretchers are modular in the sense that the basket stretcher may be broken apart or formed as hinged sections for ease of transport. Conventionally, such basket stretchers have longitudinally extending rigid rails. In the prior art, the opposed facing ends of the rails at the juncture between the sections of the split-apart basket stretcher, are releasably coupled to one another by a threaded sleeve or collar on one of the opposed facing ends of each rail threadably mounting onto threads on the other opposed facing ends of the rails. Such a sleeve or collar is referred to in the trade as a collet.

The two conventional sections of the basket stretcher are connected by spinning or screwing the collet into threaded engagement with the opposite rail ends of the opposite section of the basket stretcher. However, it has been observed that such collets once threaded into place, may become unthreaded so as to dangerously allow the sections of the basket stretcher to disconnect, while the basket stretcher is being raised or lowered so as to bump or scrape against rocks, a cliff face, the outer wall of a building etc. during use. Consequently, there exists a need, and is an object of the present invention to provide, a releasable locking mechanism which prevents the collets from inadvertently unscrewing from threaded engagement on the opposed end of the basket stretcher rail so as to no longer merely rely on the diligence of the operators to observe that the collet remains fully threaded into place. It is a further object to provide that the operators may, as before, simply screw the collet into locking engagement as in the prior art and that the locking mechanism according to the present invention not disturb the conventional threaded engagement of the collet.

Further in the prior art, applicant is aware of U.S. Pat. No. 2,843,408 which issued on Jul. 15, 1958 to Stukenborg for a Lock for Turnbuckles, U.S. Pat. No. 3,073,635 which issued Jan. 15, 1963 to Schaefer for a Shaft Coupling, U.S. Pat. No. 3,682,506 which issued Aug. 8, 1972 to Bruyere et al. for Coupling Devices and U.S. Pat. No. 6,328,499 which issued Dec. 11, 2001 to Reding et al. for a Screwed Connection for Threaded Rods. None of the prior art of which applicant is aware teach nor suggest the use of a releasable pin locking mechanism, whether resiliently biased or not, which pin locking mechanism engages behind the trailing face of the collet when in threaded engagement over the opposed rail end so as to prevent the collet unscrewing until the pin locking mechanism is depressed, removed or otherwise disengaged from preventing the rearward translation of the collet.

It is yet a further object to provide a locking mechanism, whether using a pin or other stop, for preventing the rearward translation of the collet wherein the pin mechanism does not protrude beyond the outer surface of the collet so that the trailing edge of the collet protects the stop mechanism from impacting an external rigid surface over which the basket stretcher is being bumped or dragged.

SUMMARY OF THE INVENTION

In keeping with the object set out above, in one preferred embodiment, the pin mechanism is a spring-actuated pin mounted so as to be journalled through an aperture in a sidewall of the coupling piece over which the threaded collet slides. The aperture is spaced from the end of the coupling so that when the collet is threadably engaged with the oppositely disposed threaded coupling, the trailing edge of the collet is clear of the spring-actuated pin so that the spring-actuated pin, under the resilient biasing of a pin biasing means mounted within the coupling housing, is biased outwardly of the coupling housing so as to block rearward translation of the collet until the pin is deliberately pushed flush with the coupling housing by the operator desiring to uncouple the collet. Thus during use of the basket stretcher, if the collet contacts a rigid surface over which the basket stretcher is being bumped or dragged, while being raised or lowered in use, such that the collet begins to unscrew unintentionally from its threaded engagement on the opposed rail end, the trailing edge of the collet comes into contact with the outwardly biased pin preventing any further rearward translation of the collet. When the operator is ready to disassemble the basket stretcher, the pin is manually depressed and held as the collet is unscrewed until the trailing edge of the collet has covered over the depressed end of the pin at which point the collet will then travel smoothly over the pin as it is unthreaded.

In keeping with the scope of the present invention, although in the preferred embodiment, the pin is spring-actuated, or otherwise resiliently or automatically biased into an extended position behind the trailing edge of the collet, a non-automatically or non-resiliently biased pin or other blocking means including manually placed pins releasably mountable into the coupler so as to prevent the rearward translation of the collet, hereinafter alternatively and interchangeably referred to as a collar or as a sleeve.

In summary, the present invention may be characterized as including in one aspect a split-apart basket stretcher and in a further aspect its corresponding rail coupling and lock. The stretcher includes first and second stretcher portions for mounting in opposed facing relation to one another. The first stretcher portion has at least a first rail. The second stretcher portion has at least a second rail in coaxial substantially abutting relation to the first rail or rails of the first stretcher portion when the first and second stretcher portions are mounted together. The rail coupling and lock is for releasably locking together the first and second stretcher portions in the opposed facing relation. The rail coupling and lock includes at least a slidable collar and a collar stop.

The collar is snugly slidably mounted or mountable on, so as to extend, when in an extended position, from a distal end of the first rail or rails so as to be releasably mountable, by releasable coupling means, which may be a threaded coupling, onto a distal end of the second rail or rails to thereby mount the distal ends into adjacent co-axial relation and to thereby mount the first and second stretcher portions together in opposed facing relation. The stop is disengageably mounted or mountable to the distal end of the first rail or rails so as to be adjacent and behind the collar when the collar has been slid into the extended position so as to extend from the distal end of the first rail or rails. The stop includes a stop member which, when in a raised position, is raised from the first rail or rails thereby preventing the collar from sliding back along the first rail or rails when the collar is in the extended position. A stop disengagement means is provided which cooperates with the stop member so as to provide for selective disengagement of the stop member from behind the collar to allow the collar to be dismounted from the distal end of the second rail or rails and slid back from the extended position. The stop member when in the raised position does not protrude beyond a radially outermost surface of the collar. The radially outermost surface of the collar is radially outermost relative to a longitudinal axis of symmetry of the collar.

In one embodiment the stop member is a pin and the stop disengagement means includes a resilient biasing means for biasing the pin from a retracted position into the raised position. When the pin is in the retracted position, the collar is free to slide back over the pin. When in the raised position the pin blocks sliding of the collar rearwardly from the extended position. The biasing means may be a spring such as a helical coil spring mounted or mountable in the distal end of the first rail or rails.

In one embodiment first and second end caps are provided which are mounted or mountable respectively onto the distal ends of the first rail or rails and the second rail or rails. The collar is slidably mounted or mountable on the first end cap and is releasably mountable, by releasable coupling means, onto the second end cap when the collar is slid on the first end cap so as to extend from the first end cap. The releasable coupling means may be a threaded coupling between the collar and the second end cap.

In one embodiment the first end cap has a substantially concave end and the second end cap has a substantially convex end for mating with the substantially concave end when the first and second end caps are in opposed facing relation.

In one embodiment the first rail or rails include a first pair of parallel laterally spaced apart rails, where each rail of the first pair of rails are on opposite sides of the first stretcher portion and the second rails include a second pair of parallel laterally spaced apart rails, where each rail of the second pair of rails are on opposite sides of the second stretcher portion. The first and second pairs of rails are aligned longitudinally with each other when the first and second stretcher portions are mounted to one another.

BRIEF DESCRIPTION OF THE DRAWINGS

FIG. 3a is an enlarged view of a portion of FIG. 3.

DETAILED DESCRIPTION OF EMBODIMENTS OF THE INVENTION

Figure 1:
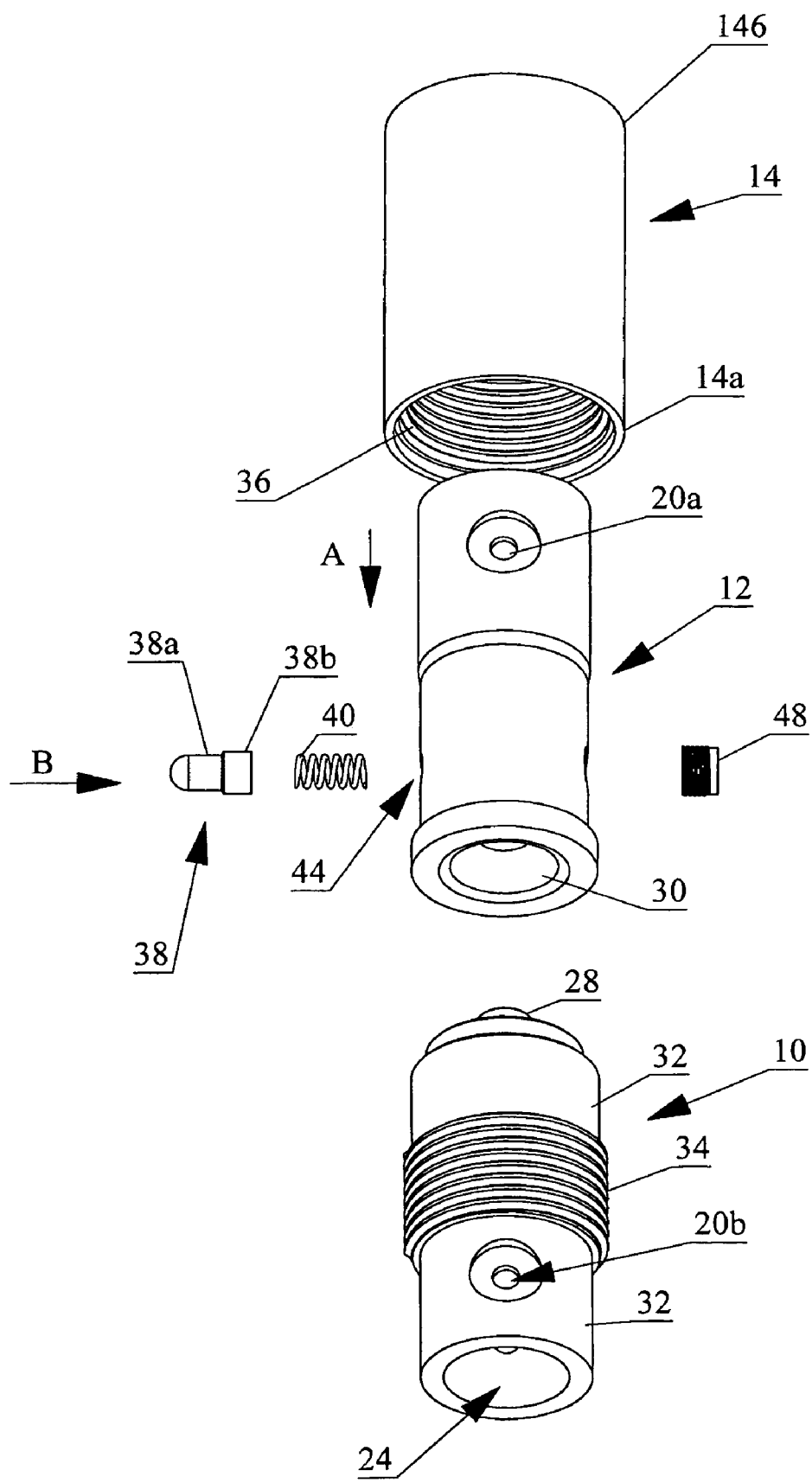
FIG. 1 is, in perspective exploded view, the rail coupling and lock according to aspect of the present invention.
Figure 2:
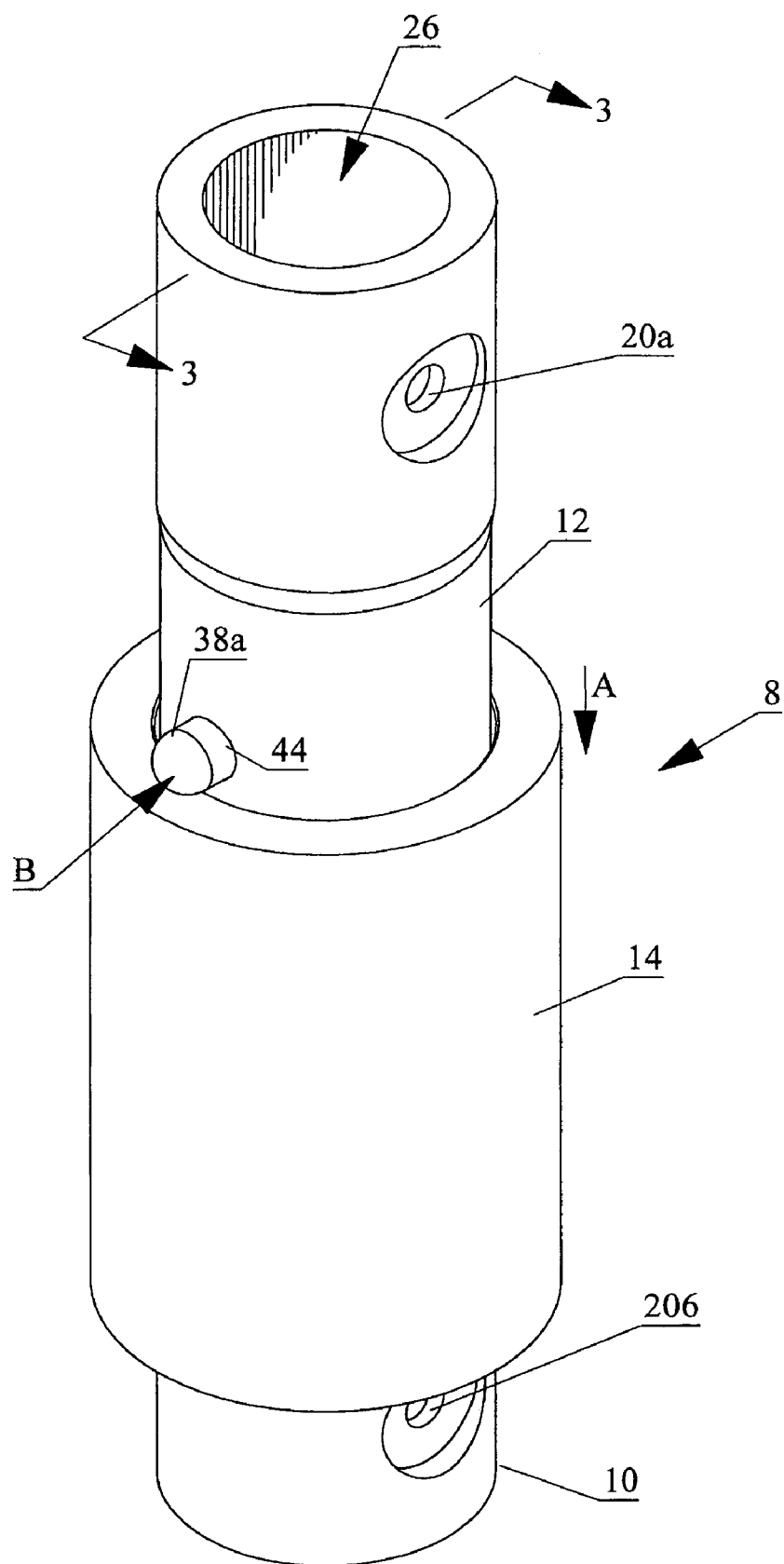
FIG. 2 is, in perspective view, the assembled and locked rail coupling and lock of FIG. 1.

As seen in the accompanying figures wherein similar characters of reference denote corresponding parts in each view, the rail coupling and lock according to one embodiment of the present invention for use on split-apart basket stretchers comprises primarily three components, namely, a threaded male-end coupling 10, a corresponding female-end coupling 12 for mating with coupling 10, and a threaded collet, collar or sleeve 14. The three components are shown dis-assembled in FIG. 1, and assembled, in FIGS. 2 and 3. In combination, the three components form a connector assembly 8 which when mounted on the ends 16a and 16b of the longitudinal rails 16 of the opposed facing half sections 18a and 18b of a conventional split-apart basket stretcher 18, may be employed to releasably lock the opposed facing ends of the rails in longitudinally-aligned abutting or adjacent relation.

Thus one end of a longitudinally extending basket stretcher rail 16 may be releasably mounted in coaxially opposed-facing relation to an adjacent end of a coaxially aligned longitudinally extending basket stretcher rail by the mounting of, for example, male end coupling 10 onto rail end 16b, and the mounting of threaded sleeve 14 and female end coupling 12 onto rail end 16a. Male end coupling 10 and female end coupling 12 may be rigidly mounted onto rail ends 16b and 16a respectively by the use of conventional fasteners (not shown) mounted through apertures 20a and 20b respectively on the couplings and the corresponding apertures 22a and 22g on the rail ends so as to engage the rail ends when the rail ends are snugly journalled into correspondingly shaped and correspondingly sized cavities 24 and 26 in the oppositely disposed ends of couplings 10 and 12 when releasably mounted to one another in mating engagement as better described below.

In operation, couplings 10 and 12 are abutted in mating engagement along common longitudinal axis L in releasable coaxial snug engagement of frusto-conical male end 28 on male end coupling 10 with correspondingly shaped female receiver 30 on female end coupling 12. Male end 28 protrudes from male end coupling 10 from the end opposite the opening into cavity 24. A cylindrical body 32 extends between male end 28 and the opening into cavity 24. Male threads 34 are formed on body 32 approximately medially spaced between male end 28 and the opening into cavity 24.

Female threads 36 are formed in the first end 14a of sleeve 14 and are sized so as to snugly threadably mount onto corresponding male threads 34 on male end coupling 10. Thus, as sleeve 14 is a hollow cylinder, it may be slidably mounted onto female end coupling 12 so as to dispose first end 14a in direction A towards female receiver 30. When male end coupling 10 is mounted to female end coupling 12 by mating engagement of male end 28 with female receiver 30, sleeve 14 may be slid further in direction A so as to slide first end 14a over the interface between male end 28 and female receiver 30 into threaded engagement with male threads 34.

The smooth translation of sleeve 14 in direction A over female end coupling 12 is accomplished by first depressing spring loaded pin 38 in direction B against the return biasing force of a helical coil spring 40. Spring 40 is mounted in transverse bore 42 in female end coupling 12 so as to slidably dispose the narrow end 38a of pin 38 through correspondingly narrow aperture 44 extending from bore 42. The base end 38b of pin 38 is too wide to pass through aperture 44 and so seats against the shoulder 46 between aperture 44 and bore 42 under the resilient biasing of spring 40 mounted within bore 42 and secured therein by threaded plug 48 or the like.

Figure 3:
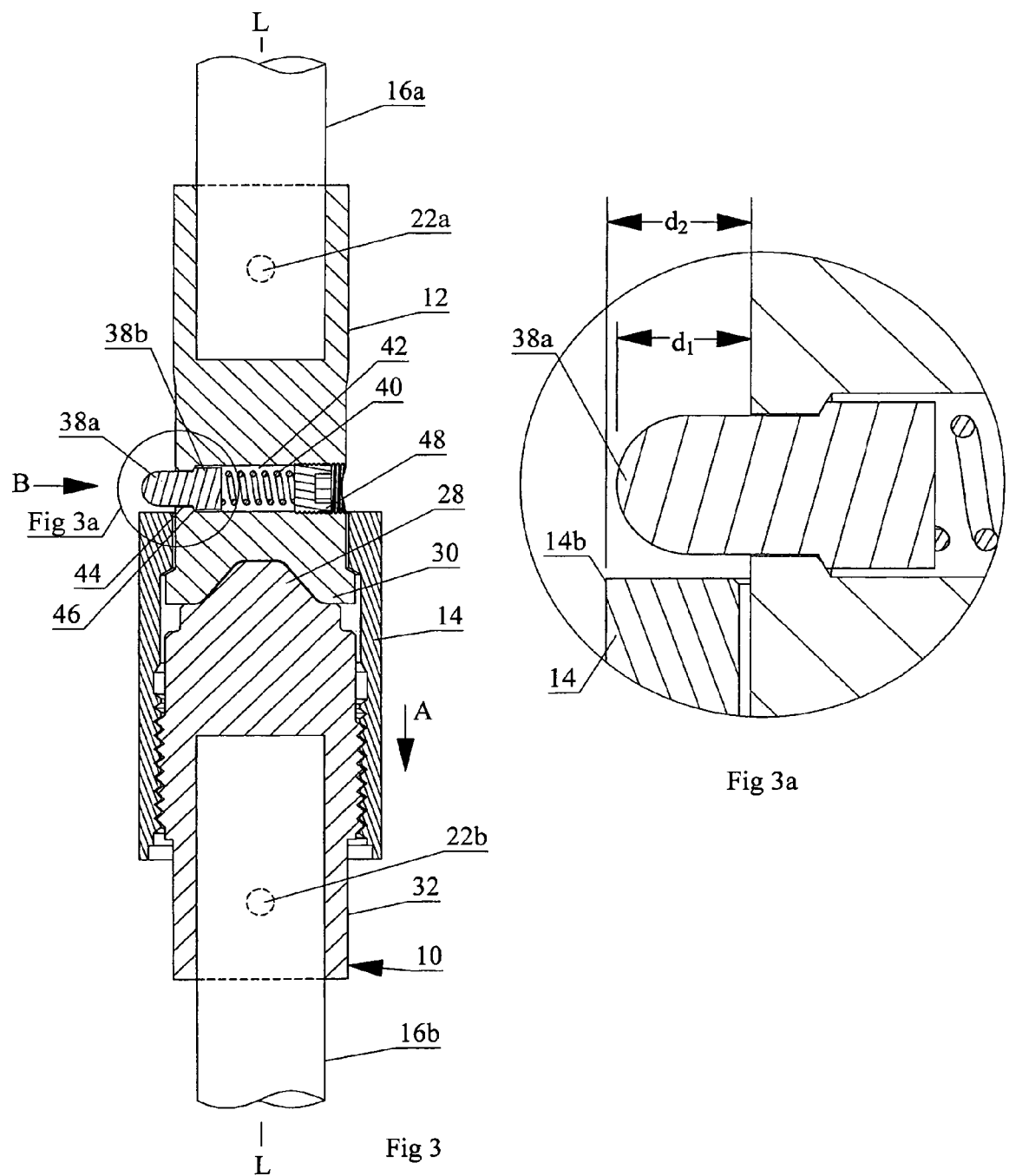
FIG. 3 is a cross sectional view along line 3—3 in FIG. 2, and also illustrating how the rail coupling and lock of FIG. 2 is mounted onto the ends of the rails of a split-apart basket stretcher.
Figure 4:
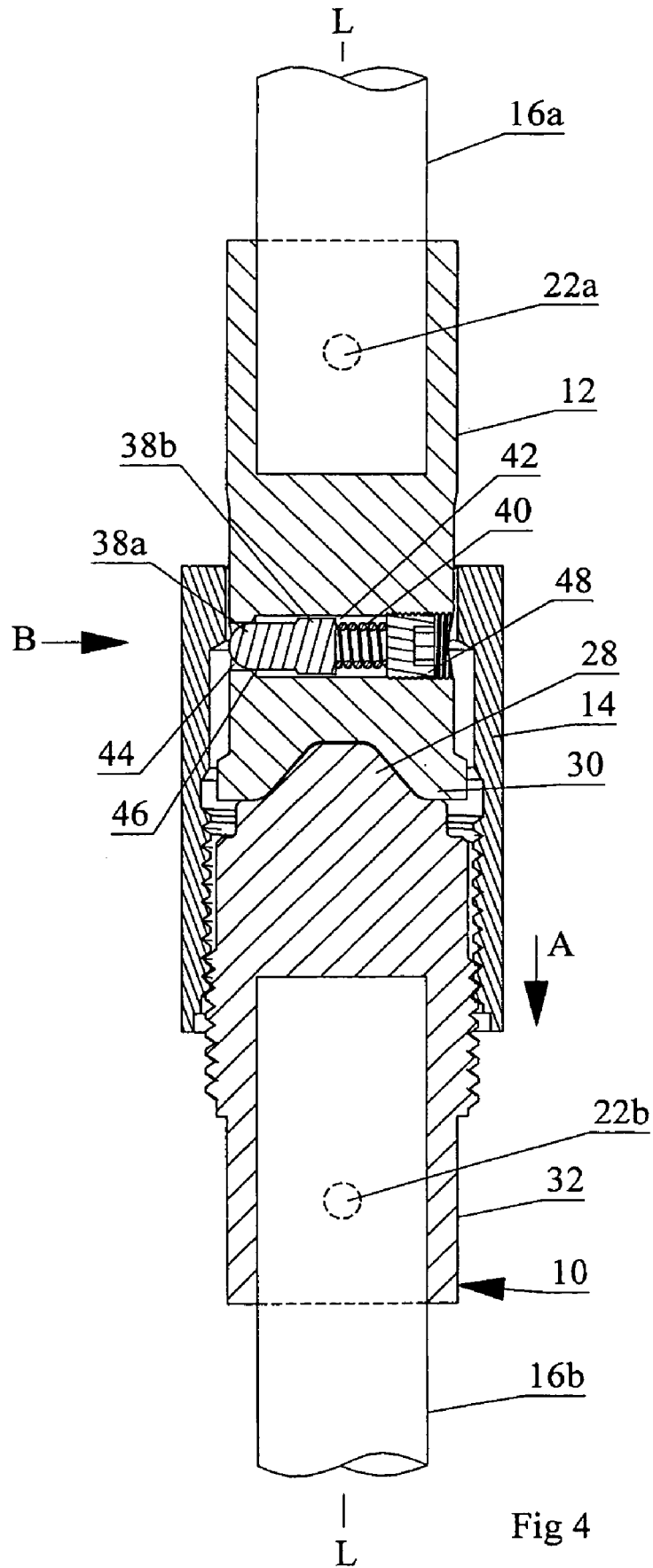
FIG. 4 is the view of FIG. 3 with the collet partially unthreaded.
Figure 5:
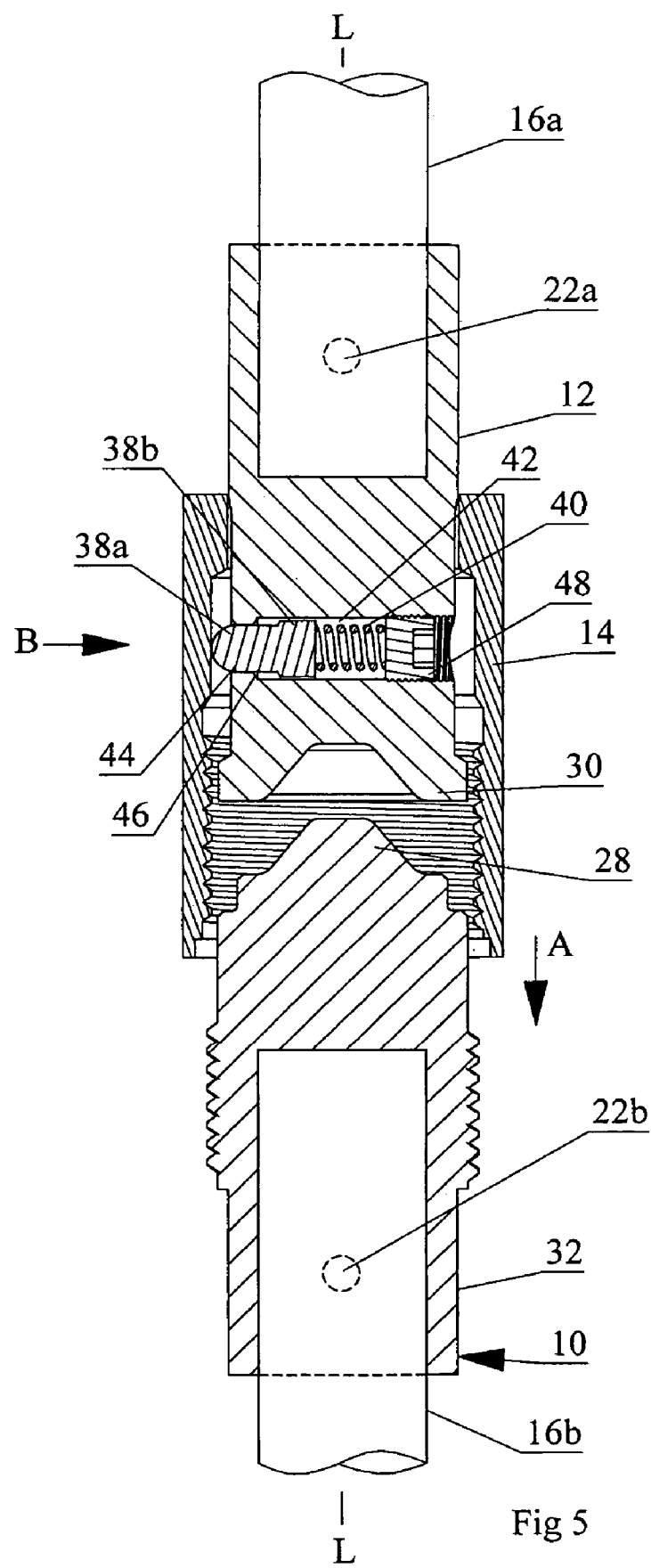
FIG. 5 is the view of FIG. 4 with the collet further unthreaded.
Figure 6:
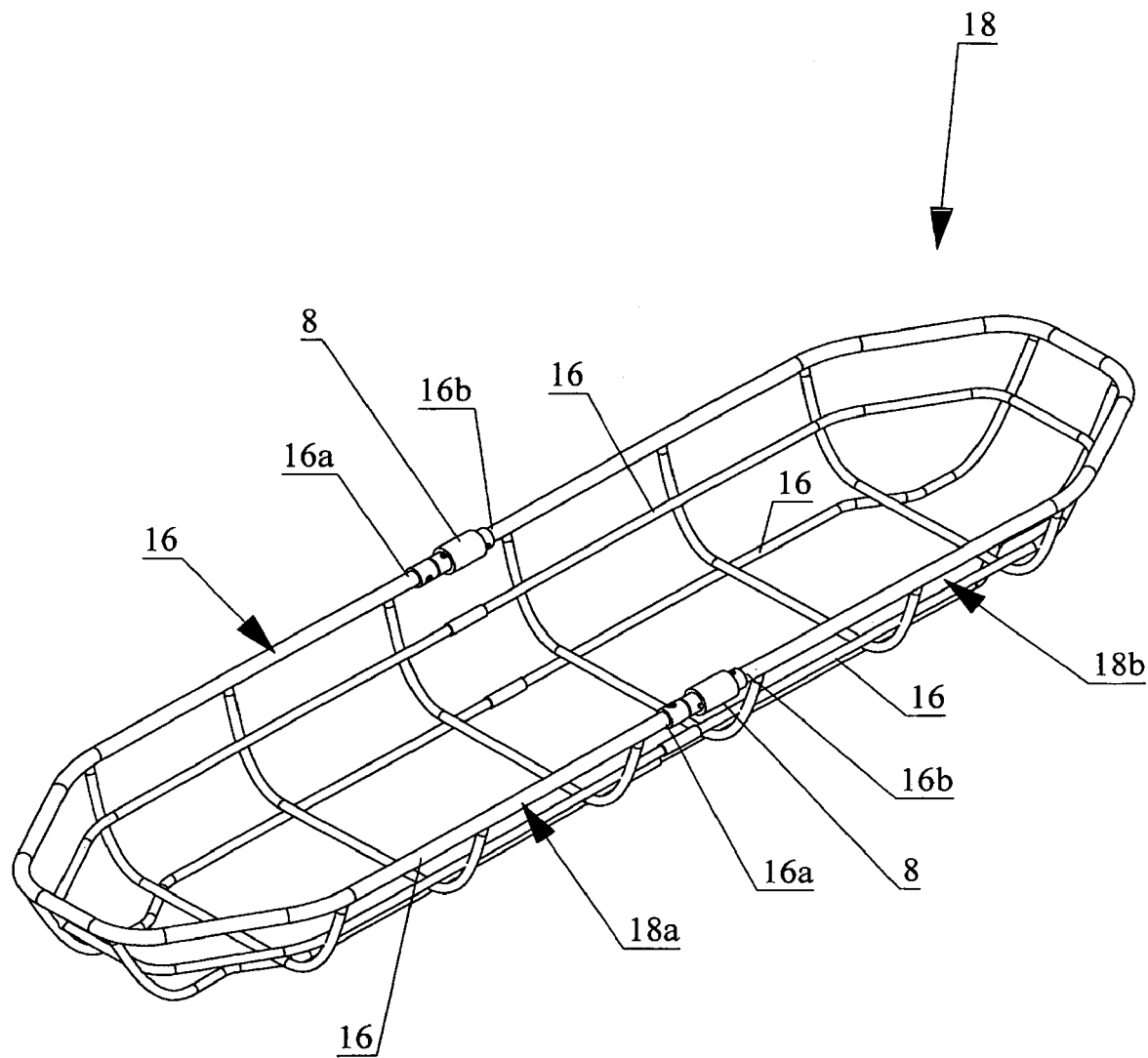
FIG. 6 is a view of a split-apart basket stretcher according to a further aspect of the present invention employing the rail coupling and locks of FIG. 2.

The longitudinally extending length of threads 34 and 36, and the longitudinal length of sleeve 14 are sized such that, with female threads 36 fully threaded onto male threads 34 so as to fully translate sleeve 14 in direction A over body 32 of male end coupling 10, second end or shoulder 14b of sleeve 14 has been slid over and past pin 38 on female end coupling 12 so as to allow pin 38 to return to its extended position such as seen in FIG. 3 thereby releasably locking sleeve 14 in its relative longitudinal position over body 32 of male end coupling 10. The use of spring loaded pin 38, or other rearward translation blocking means, assists in preventing the unwanted backing-off or rearward translation of sleeve 14 in a direction opposite to direction A from threaded engagement on male end coupling 10. Such backing-off has been found to occur when basket stretchers are being raised or lowered so as to drag the rails, and their corresponding threaded couplers, along the outer face of a cliff, building or the like.

Thus, so long as the distance $d_1$ that pin 38, when fully extended, protrudes from female end coupling 12 is less than the shoulder height $d_2$ of the shoulder 14b of the outer surface of sleeve 14 relative to the outer surface of female end coupling 12, or likewise for other blocking means, then pin 38 will be protected by the shoulder from impacting the face of the cliff or building or the like. Thus pin 38 will remain undisturbed and protruding from female end coupling 12 thereby blocking sleeve 14 from backing-off by unthreading over male end coupling 10 until the operator desires to split apart the basket stretcher, at which time pin 38 is once again depressed in direction B allowing the unthreading of sleeve 14 from male end coupling 10.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A split-apart basket stretcher comprising:
   first and second stretcher portions for mounting in opposed facing relation to one another, wherein said first stretcher portion has at least a first rail and wherein said second stretcher portion has at least a second rail in coaxial substantially abutting relation to said at least a first rail when said first and second stretcher portions are mounted together,
   a rail coupling and lock for releasably locking together said first and second stretcher portions in said opposed facing relation, said rail coupling and lock including a collar snugly slidably mounted on, so as to extend, when in an extended position, from a distal end of said at least a first rail so as to be releasably mountable, by releasable coupling means, onto a distal end of said at least a second rail to thereby mount said distal ends into adjacent co-axial relation and to thereby mount said first and second stretcher portions together in said opposed facing relation,
   a stop disengageably mounted to said distal end of said at least a first rail so as to be adjacent and behind said collar when said collar has been slid into said extended position so as to extend from said distal end of said at least a first rail, said stop including a stop member raised, when in a raised position, from the at least a first rail thereby preventing said collar from sliding back along said at least a first rail when said collar is in said extended position,
   a stop disengagement means cooperating with said stop member so as to provide for selective disengagement of said stop member from behind said collar to allow said collar to be dismounted from said distal end of said at least a second rail, and, slid back from said extended position
   wherein said stop member when in said raised position does not protrude beyond a radially outermost surface of said collar, radially outermost relative to a longitudinal axis of symmetry of said collar.

2. The apparatus of claim 1 wherein said at least a first rail includes a first pair of parallel laterally spaced apart rails, each rail of said first pair on opposite sides of said first stretcher portion and wherein said at least a second rail includes a second pair of parallel laterally spaced apart rails, each rail of said second pair on opposite sides of said second stretcher portion, said first and second pairs aligned longitudinally when said first and second stretcher portions are mounted to one another.

3. The apparatus of claim 1 wherein said stop member is a pin and said stop disengagement means includes a resilient biasing means for biasing said pin from a retracted position into said raised position,
   wherein, when said pin is in said retracted position, said collar is free to slide back over said pin, and when in said raised position said pin blocks sliding of said collar rearwardly from said extended position.

4. The apparatus of claim 3 wherein said biasing means is a spring.

5. The apparatus of claim 4 wherein said spring is a helical coil spring mounted in said distal end of said at least a first rail.

6. The apparatus of claim 1 further comprising first and second end caps mounted respectively onto said distal ends of said at least a first rail and said at least a second rail, and wherein said collar is slidably mounted on said first end cap and is releasably mountable, by releasable coupling means, onto said second end cap when said collar is slid on said first end cap so as to extend from said first end cap.

7. The apparatus of claim 6 wherein said releasable coupling means is a threaded coupling between said collar and said second end cap.

8. The apparatus of claim 1 wherein said releasable coupling means is a threaded coupling between said collar and said distal end of said at least a second rail.

9. The apparatus of claim 7 wherein said first end cap has a substantially concave end and wherein said second end cap has a substantially convex end for mating with said substantially concave end when said first and second end caps are in said opposed facing relation.

10. The apparatus of claim 5 further comprising first and second end caps mounted respectively onto said distal ends of said at least a first rail and said at least a second rail, and wherein said collar is slidably mounted on said first end cap and is releasably mountable, by releasable coupling means, onto said second end cap when said collar is in said extended position.

11. The apparatus of claim 10 wherein said releasable coupling means is a threaded coupling between said collar and said second end cap.

12. The apparatus of claim 11 wherein said first end cap has a substantially concave end and wherein said second end cap has a substantially convex end for mating with said substantially concave end when said first and second end caps are in said opposed facing relation.

13. A rail coupling and lock for a split-apart basket stretcher, wherein the stretcher includes first and second stretcher portions for mounting in opposed facing relation to one another, wherein said first stretcher portion has at least a first rail and wherein said second stretcher portion has at least a second rail in coaxial substantially abutting relation to said at least a first rail when said first and second stretcher portions are mounted together, and wherein said rail coupling and lock is for releasably locking together said first and second stretcher portions in said opposed facing relation, said rail coupling and lock comprising:
 a collar snugly slidably mountable on, so as to extend, when in an extended position, from a distal end of the at least a first rail so as to be releasably mountable, by releasable coupling means, onto a distal end of the at least a second rail to thereby mount the distal ends into adjacent co-axial relation and to thereby mount the first and second stretcher portions together in opposed facing relation,
 a stop disengageably mountable to said distal end of the at least a first rail so as to be adjacent and behind said collar when said collar has been slid into said extended position so as to extend from the distal end of the at least a first rail, said stop including a stop member raised, when in a raised position, from the at least a first rail thereby preventing said collar from sliding back along the at least a first rail when said collar is in said extended position,
 a stop disengagement means cooperating with said stop member so as to provide for selective disengagement of said stop member from behind said collar to allow said collar to be dismounted from the distal end of the at least a second rail and slid back from said extended position,
 wherein said stop member when in said raised position does not protrude beyond a radially outermost surface of said collar, radially outermost relative to a longitudinal axis of symmetry of said collar.

14. The apparatus of claim 13 wherein said stop member is a pin and said stop disengagement means includes a resilient biasing means for biasing said pin from a retracted position into said raised position,
 wherein, when said pin is in said retracted position, said collar is free to slide back over said pin, and when in said raised position said pin blocks sliding of said collar rearwardly from said extended position.

15. The apparatus of claim 14 wherein said biasing means is a spring.

16. The apparatus of claim 15 wherein said spring is a helical coil spring mountable in the distal end of the at least a first rail.

17. The apparatus of claim 13 further comprising first and second end caps mountable respectively onto the distal ends of the at least a first rail and the at least a second rail, and wherein said collar is slidably mountable on said first end cap and is releasably mountable, by releasable coupling means, onto said second end cap when said collar is slid on said first end cap so as to extend from said first end cap.

18. The apparatus of claim 17 wherein said releasable coupling means is a threaded coupling between said collar and said second end cap.

19. The apparatus of claim 13 wherein said releasable coupling means is a threaded coupling between said collar and the distal end of the at least a second rail.

20. The apparatus of claim 18 wherein said first end cap has a substantially concave end and wherein said second end cap has a substantially convex end for mating with said substantially concave end when said first and second end caps are in said opposed facing relation.

* * * * *